United States Patent [19]

Laurent

[11] 4,428,422

[45] Jan. 31, 1984

[54] DEVICE PROVIDED WITH RETRACTABLE ARMS FOR THE ANCHORING OF AN INSTRUMENT IN A CAVITY

[75] Inventor: Jean Laurent, Orgeval, France

[73] Assignee: Institut Francais du Petrole, Rueil-Malmaison, France

[21] Appl. No.: 356,614

[22] Filed: Mar. 9, 1982

[30] Foreign Application Priority Data

Mar. 9, 1981 [FR] France ............................. 81 04811

[51] Int. Cl.³ ............................................ E21B 23/00
[52] U.S. Cl. ..................................... 166/212; 166/53; 405/302; 60/473
[58] Field of Search ............... 166/212, 206, 120, 213, 166/241, 243, 53, 54, 65 R, 66, 174, 324, 187, 382, 104; 405/302; 60/473, 475, 476, 484

[56] References Cited

U.S. PATENT DOCUMENTS 3,104,712 9/1963 Whitten ................................ 166/66
3,356,146 12/1967 Anderson ........................... 166/241
3,430,698 3/1969 Urbanosky ......................... 166/212
3,661,205 5/1972 Belorgey ........................... 166/65 R
4,191,498 3/1980 Weirich et al. ..................... 405/302

FOREIGN PATENT DOCUMENTS 265824 1/1971 U.S.S.R. ............................. 405/302
197801 1/1978 U.S.S.R. ............................. 166/212

Primary Examiner—James A. Leppink
Assistant Examiner—Hoang C. Dang
Attorney, Agent, or Firm—Millen & White

[57] ABSTRACT

A retractable anchoring device for a sonde to be lowered into a well for logging purpose, is adapted to rigidly position the sonde at a preselected depth. The device comprises pivotable anchoring arms adapted to apply against the wall of the well a substantially constant force produced by associated jacks actuated by driving means so as to apply to the respective arms forces which are limited by specific valves therefor in the hydraulic circuit feeding of the jacks.

12 Claims, 10 Drawing Figures

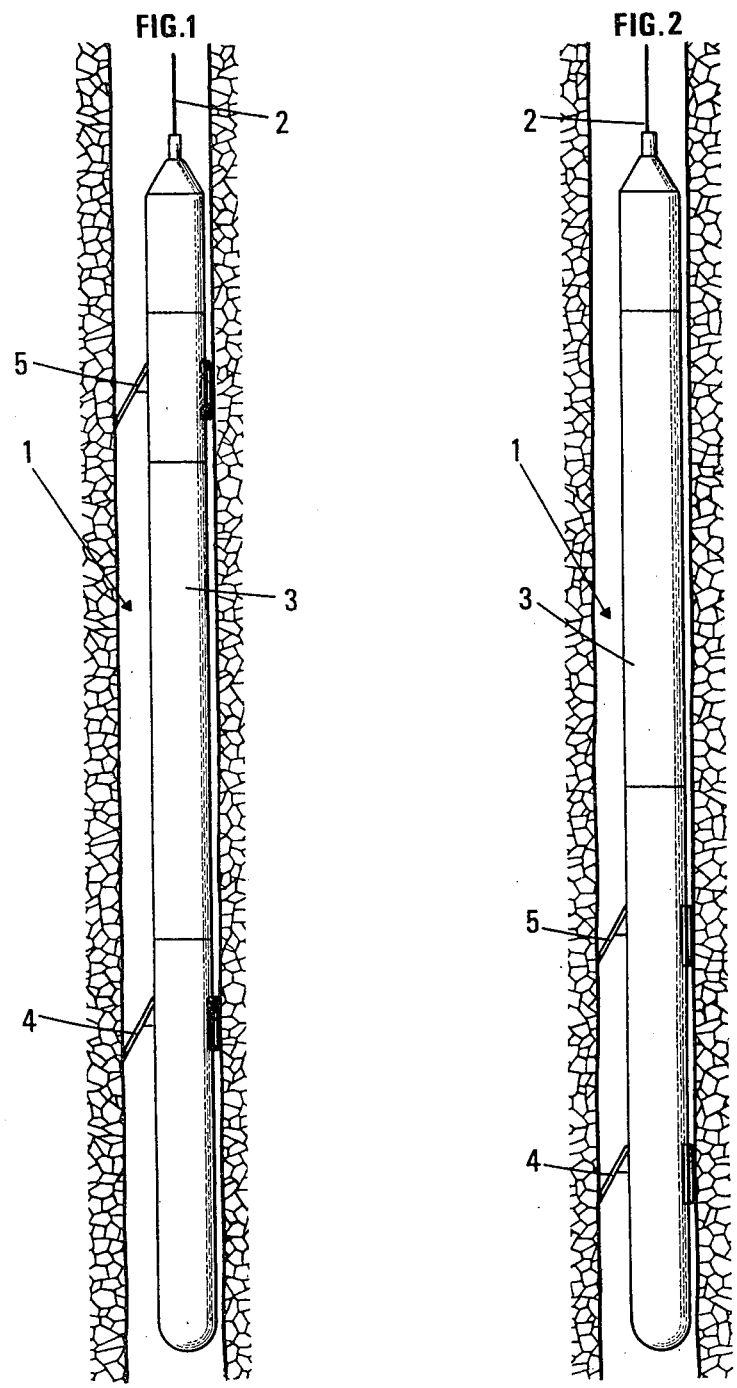

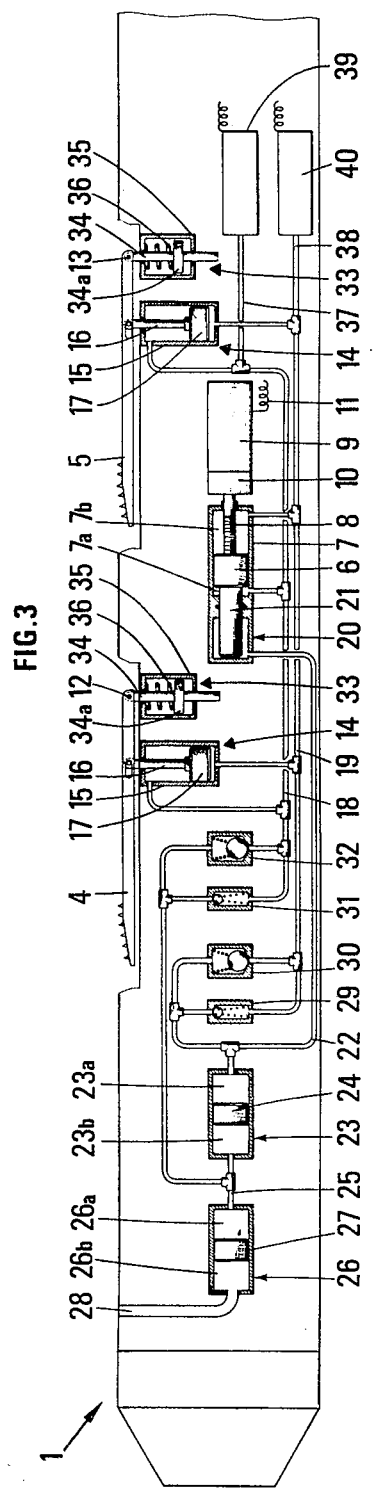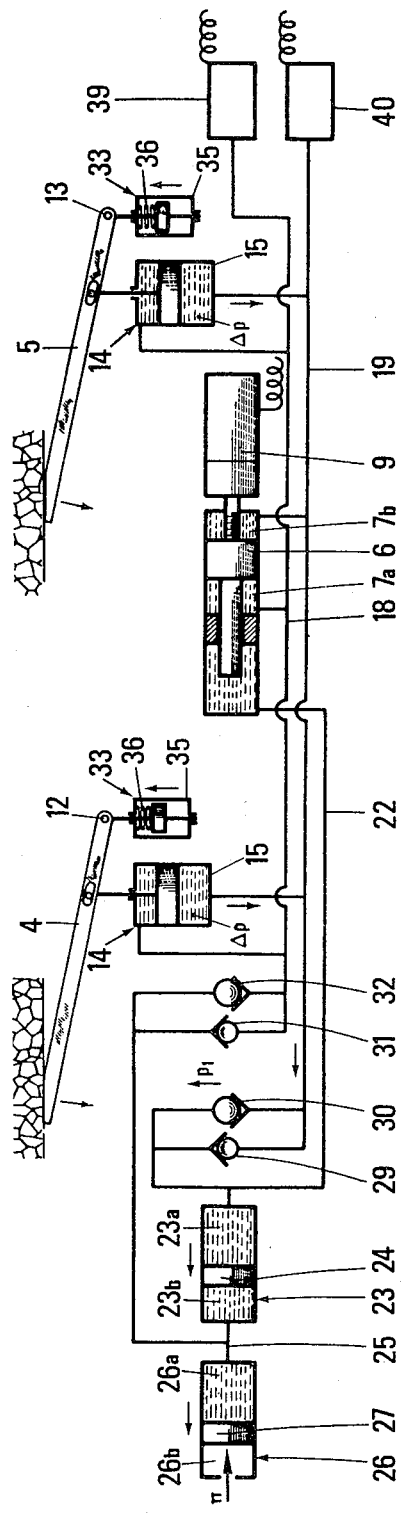

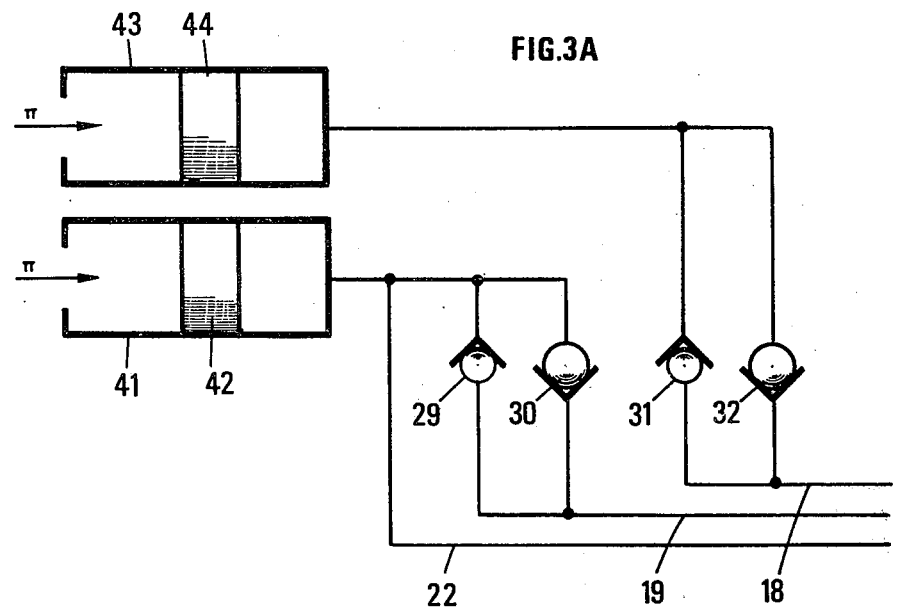
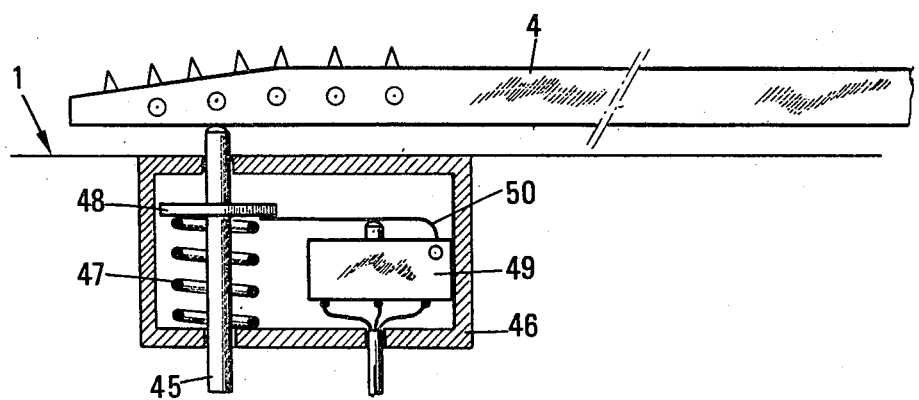

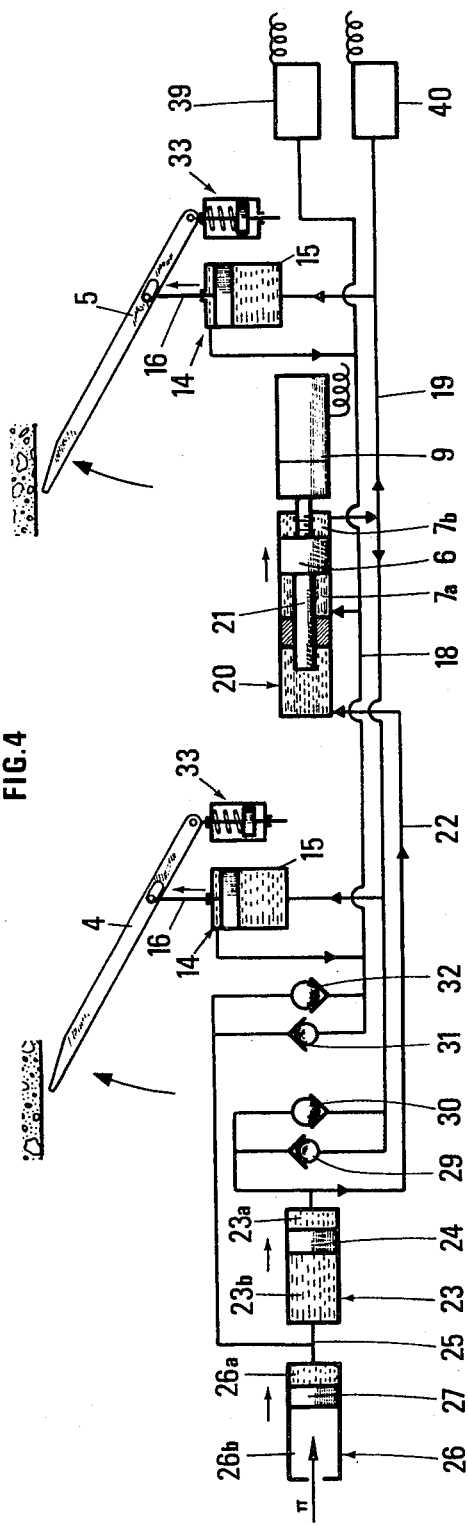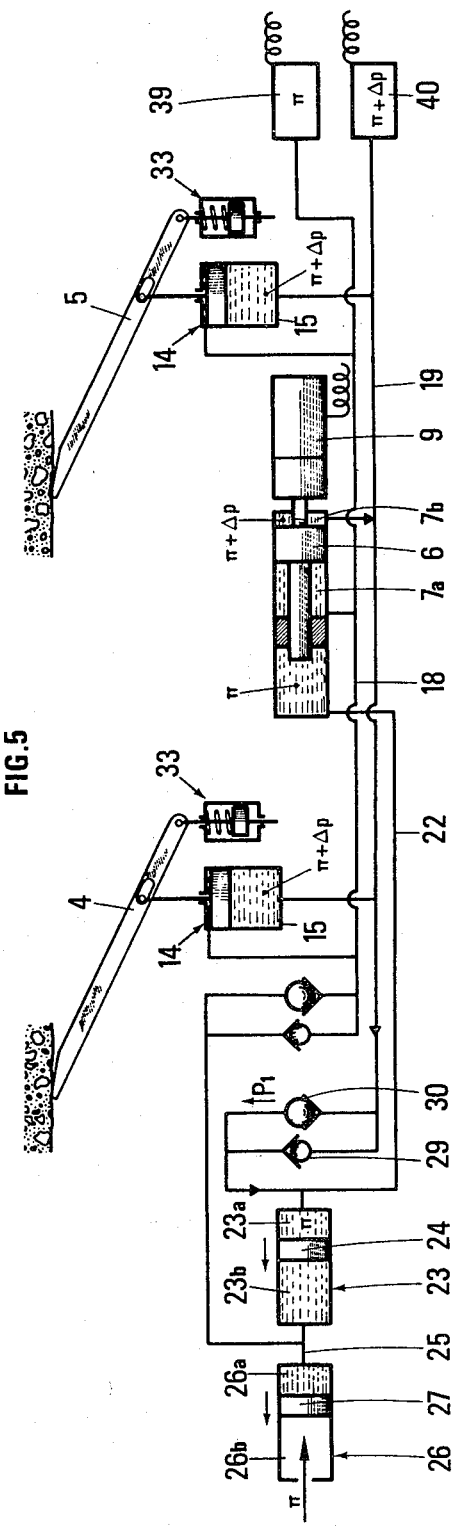

DEVICE PROVIDED WITH RETRACTABLE ARMS FOR THE ANCHORING OF AN INSTRUMENT IN A CAVITY

BACKGROUND OF THE INVENTION

The present invention relates to a retractable anchoring device adapted to rigidly position by intermittance an instrument inside a cavity by application of movable arms against the wall thereof.

More particularly, the invention concerns an anchoring device with retractable arms, adapted to maintain intermittently inside a drilling well, wherein it is lowered at the end of a cable, a sonde equipped with a measuring apparatus particularly for use in seismic prospecting.

Such a sonde may be equipped, for example, with seismic sensors (geophones or hydrophones) for receiving seismic waves of the longitudinal type (P waves), or of the transverse type (S waves), transmitted from a source of seismic shocks placed at the surface of the earth close to the well. The sonde sensors sense the waves directly transmitted from the surface and the echoes of the transmitted waves on the underground reflecting layers. The direct waves are used for determining the sound propagation velocity through the traversed formations, as well for the P waves as for the S waves, (i.e., acoustic coring). The echoes received by the sonde sensors make it possible to locate the actual position of the reflecting layers and, optionally, to estimate the sound propagation velocity in certain zones located below the bore hole.

The sonde may also be equipped with acoustic waves transmitters and receivers for determining certain characteristics of the formations traversed by the borehole at the vicinity thereof, (i.e. acoustic logging).

The systems for anchoring these devices, lowered into holes or wells drilled through the earth at the end of a cable, generally comprise one or more pivotable arms which can be moved aside or retracted at will by driving means. These means may be merely mechanical and comprise, for example, and endless screw driven in rotation by an electric motor controlled from the surface. In this case, the rotation of the screw displaces a nut which is integral with one or more links connected to the pivoting arms. For purposes of security, it must always be possible to retract the arms, even in the case of stopping of the driving motor and, accordingly, it is generally preferred to rigidly secure the ends of the links to a ring on which a spring bears. The expansion of the spring has the effect of pushing the ring and moving the arms aside. The motor is only used to retract the arms. The nut motion, controlled by the rotation of the endless screw, results in the ring being driven off and in the compression of the spring. In the case where the motor is stopped, the back motion of the ring due to the compression of the spring provides for the retraction of the arms. By making use of such an arrangement, the bearing force of the arms against the walls of the well is the lower as they are more spaced aside and the spring becomes more expanded, and it in some cases may even become insufficient to ensure a satisfactory anchoring of the sonde system on the walls of the well.

In other prior systems, the driving means for actuating the arms in rotation are of the hydraulic type. An electric motor drives a hydraulic pump feeding, with fluid under pressure, either a single jack replacing the assembly of the endless screw and the nut and acting on the links, or jacks directly acting on the pivoting arms. The hydraulically controlled systems are advantageous since the force applied to the arms is independent from their spacing with respect to the sonde body, but they are difficult to operate inasmuch as they make use of hydraulic pumps whose operation becomes critical in the severe pressure and temperature conditions prevailing at the bottom of a well. As a matter of fact, it is known that, in a bore hole, at a 3000 m depth for example, with a mud of density 1.3, the static pressure may reach 40 MPa and the temperature may rise up to 150° or 200° C. so that it is difficult under these conditions to maintain a sufficient viscosity of the liquid of the pump circuit.

SUMMARY OF THE INVENTION

The device according to the invention avoids the above mentioned drawbacks by making use of actuating means adapted for applying onto one or more movable arms, constant forces by displacement of a piston inside a cylinder containing a liquid, under the action of driving means. Each arm is separately controlled by a jack communicating through pipes with the cylinder. For a safer operation of the anchoring device, the cylinder is associated with first means for applying to the piston the static pressure prevailing in the well, and second for limiting the forces applied up to the anchoring arms.

BRIEF DESCRIPTION OF THE DRAWINGS

Other characteristics and advantages will be made apparent from the following description of an embodiment selected by way of non-limitative example, and given with reference to the accompanying drawings wherein:

FIG. 1 diagrammatically shows a sonde rigidly positioned inside a well by moving aside the two arms of the anchoring device, each provided near a respective end of the sonde body.

FIG. 2 diagrammatically shows a sonde rigidly positioned inside a well by moving aside the two arms provided both in the same portion of the sonde body;

FIG. 3 diagrammatically shows the assembly of the system for operating the anchoring arms which assembly is, arranged inside the sonde;

FIG. 3A diagrammatically shows an alternative embodiment of the means for applying to the piston the static pressure prevailing in the well, used in the actuation system shown in FIG. 3;

FIG. 4 diagrammatically shows the operating system during the phase of moving aside the anchoring arms;

FIG. 5 diagrammatically shows the operating system in the case where the arms are blocked during their motion aside;

FIG. 8 diagrammatically shows the operation of the security system whereby the arms are retracted in the case of blocking of the driving means;

FIG. 9 diagrammatically shows an element for sensing the retraction of each anchoring arm.

DETAILED DISCUSSION OF THE INVENTION

Figure 6:
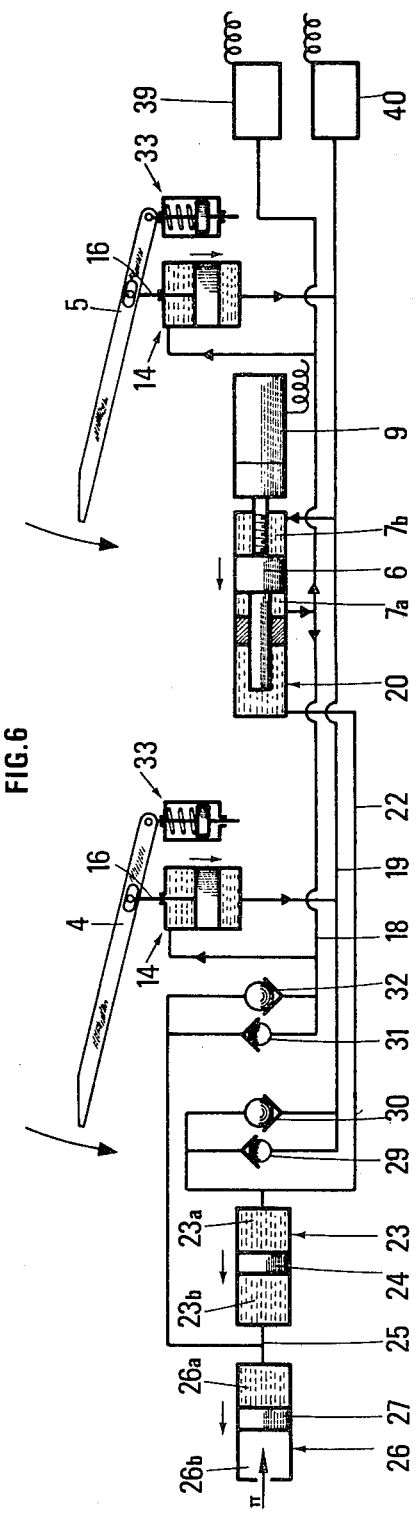
FIG. 6 diagrammatically shows the operation system during the retractation phase of the anchoring arms.
Figure 7:
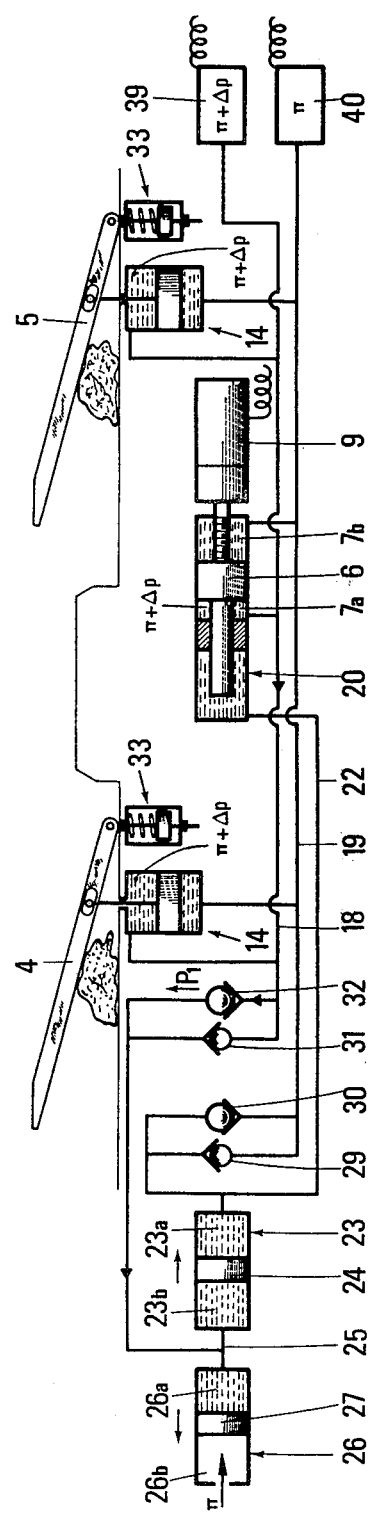
FIG. 7 diagrammatically shows the operating system in the case where a blocking of the arms occurs during the retractation phase.

With reference to the embodiment of FIG. 1, the anchoring device according with the invention is associated to a sonde 1 which is lowered into a bore hole and connected to a surface installation (not shown) through a multi-conductor cable 2 which also functions as suspension cable. The sonde comprises a compartment 3 adapted to contain seismic prospecting apparatuses such as geophones, for example. The anchoring device comprises for example two anchoring arms 4 and 5, ending at tips. The arms 4 and 5 can pivot about the sonde body and apply against the wall of the well when operated by an actuation system as described hereinafter. The two arms are located on the same side of the sonde body, on both sides of compartment 3, and their motion to the side results in the application thereof against the wall.

According to the embodiment of FIG. 2, the sonde body is identical to that of FIG. 1. The anchoring arms 4 and 5 are located on the same side with respect to the compartment but both towards the end opposite to the suspension cable 2.

With reference to FIG. 3, the system for actuating the anchoring arms 4 and 5, comprises a piston 6 adapted to tightly slide into cylinder 7, thus defining two chambers 7a and 7b therein.

The piston comprises, along its axis, a threaded housing for a screw 8 to be driven in rotation by motor means, comprising an electric motor 9 and a reducing gear 10. The motor 9 is fed with electric current through conductors 11, connected to the surface installation (not shown) through the multi-conductor cable 2 (FIG. 1).

Means, (not shown), are provided to prevent the rotation of piston 6 inside cylinder 7. Accordingly, the driving in rotation of the screw 8 by actuation of the driving means, produces a translational movement of the piston inside the cylinder.

The anchoring arms 4 and 5 may pivot about two axes, respectively 12 and 13, under actuation of two jacks 14, each comprising a cylindrical body 15, inside which may slide a rod 16 provided with a head 17. The respective ends of the two jack rods are rigidly secured to the anchoring arms 4 and 5. The two ends of each jack body, on both sides of heads 17, communicate through lines 18 and 19, respectively with the two chambers 7a and 7b of cylinder 7 on both sides of piston 6.

The means for subjecting piston 6 to the static pressure $\pi$ prevailing in the well comprises a second cylinder 20 secured to cylinder 7 and communicating therewith by an orifice wherethrough tightly slides a rod 21 integral with piston 6, as well as a third cylinder 23, divided into two compartments 23a, 23b, by a free piston 24 adapted for tightly sliding therein. One of these compartments 23a, communicates through a line 22 with the second cylinder 20. The other compartment 23b of the third cylinder 23 communicates with means for generating a counter-pressure equal to pressure $\pi$ prevailing in the cavity. The generating means comprises a fourth cylinder 26 divided into two parts 26a and 26b, by a second free piston 27, tightly sliding therein. A first part 26a communicates through line 25 with the second compartment 23b of the third cylinder. The other part 26b communicates with the cavity through line 28 in the sonde body.

The static pressure $\pi$ prevailing in the well is, accordingly, applied permanently to the free piston 27. The four cylinders 7, 20, 23 and 26, the two jacks 14 and the assembly of lines 18, 19, 22 and 25 interconnecting them are filled with oil at an equilibrium pressure maintained equal to the pressure prevailing in the well by the means for applying the static pressure $\pi$.

The means for limiting the forces applied to the anchoring arms comprises a hydraulic security system and security mechanical operating members 33. The hydraulic security system comprises a first assembly made up of a balancing valve 29 and a security valve 30 provided on two parallel line sections, communicating on one side with line 22 and the first compartment 23a of the third cylinder 23, on the other side with lines 19 and chamber 7b of cylinder 7. The valve 29 is a one-way valve and provides for the passage of the oil from line 22 to line 19 when the pressure difference exceeds a first threshold value $P_0$, selected for example, equal to 2 bars (200 kPa). The security valve 30 is also a one-way valve but it opens in a direction opposite to that of the opening direction of the balancing valve 29. The security valve 30 allows oil transfer from line 19 to line 22 and to the first compartment 23a of the third cylinder 23 when the pressure difference exceeds a second threshold-value $P_1$, selected for example, from 40 to 50 bars (4 to 5 MPa).

The hydraulic security system also comprises a second assembly made up of a balancing valve 31 and a security valve 32, provided on two parallel line sections communicating on one side with line 25 and, consequently, with the second compartment 23b of the third cylinder 23, and on the other side with line 18 and chamber 7a of cylinder 7. Similarly, the valve 31 allows the oil transfer exclusively from line 25 to line 18, when the pressure difference exceeds a first threshold value and the security valve 32 allows the oil transfer in a reverse direction only when the pressure difference exceeds a second higher threshold value. The threshold-values are preferably chosen respectively identical to those ($P_0$, $P_1$) of the first assembly.

The security members 33 are arranged so as to allow the radial displacement of the pivot axes 12 and 13 with respect to the sonde body. For this purpose, they each comprise a rod 34 passing through the two end walls of a cylindrical housing 35 secured to the sonde body, to which is fixed the pivot axes 12 and 13, and a spring 36 bearing on one of the end walls of said housing and on a shoulder 34a of rod 34. The springs 36 are calibrated so that the pivot axes 12 and 13 do not move aside body 1, except when the force exerted on the end of each anchoring arm 4 and 5 is higher than a predetermined value.

The lines 18 and 19 are respectively connected through two pipes 37 and 38 to two pressure transducers 39 and 40 adapted to convert the pressure values to electric voltages, these transducers being electrically connected to the multi-conductor cable 2. According to the alternative embodiment diagrammatically shown in FIG. 3A, the two parallel line sections provided with the balancing valve 29 and the security valve 30, as well as line 22, communicate with a first end of a cylinder 41, wherein is tightly arranged a free slidable piston 42, with the other end of said cylinder directly communicating with the well. Similarly, the two parallel line sections provided with the balancing valve 31 and the security valve 32, communicate with a first end of a cylinder 43, identical to cylinder 41, wherein a free piston 44 is slidably arranged, with the other end of said cylinder 43 also directly communicating with the well.

The element for sensing the retraction of each arm comprises (FIG. 9), a push-member 45 adapted to move inside a casing 46 integral with the sonde body 1. An opening in the casing and in the external wall of the body, having a section adapted to that of the push-member, allows the latter to project outside the sonde. A spring 47 bearing on a wall of casing 46 and on a shoulder 48 of the push-member, urges the latter towards the exterior of the body. A switch 49 arranged in the casing 46 is actuated by a flexible leaf 50, whereon abuts the shoulder 48. This switch is connected to the feeding circuit of the motor 9 (FIG. 3).

A break switch (not shown) is provided at the surface in the feeding circuit of the electric motor 9 for cutting off the power thereto when the mechanical stresses imparted thereto by the hydraulic system for controlling the anchoring arms exceeds certain preselected limits.

The different operating phases of the anchoring device are illustrated in FIGS. 4 through 8.

The pivoting of the anchoring arms 4 and 5 towards their spaced apart position is obtained by actuating motor 9 for displacing piston 6 in a direction such that the volume of chamber 7b of cylinder 7 decreases (FIG. 4). The oil expelled from chamber 7b is transferred through line 19 to the body 15 of jacks 14 and pushes against the rods 16, thereby moving aside the anchoring arms 4 and 5. The displacement of piston 6 resulting in a retraction of rod 21 outside from the second cylinder 20, oil is transferred from the first compartment 23a of the third cylinder 23 to the second cylinder through line 22, and a displacement of the free pistons 24 and 27 in their respective cylinders 23 and 26 occurs.

When the end of the arms abuts strongly against the wall of the well (FIG. 5), an overpressure $\Delta P$ is generated in line 19. The required mechanical strength of motor 9 as a result of this overpressure, and consequently, its electric consumption increase up to the triggering of the break switch. The security valve 30 limits in any case this overpressure $\Delta P$ into line 19 to the threshold value $P_1$ at which it has been calibrated. In case of excessive overpressure, an oil transfer occurs through valve 30 into compartment 23a of cylinder 23, resulting in a sliding of the free piston 24. The oil expelled from compartment 23b is transferred into the portion 26a of the fourth cylinder 26, thereby producing a sliding of the free piston 27.

The anchoring arms are retracted and the sonde body 1 is released by actuating motor 9 to displace piston 6 in such a direction that the volume of chamber 7a of cylinder 7 decreases (FIG. 6). The oil expelled from chamber 7a is transferred through line 18 to the body 15 of the two jacks 14, resulting in the penetration of their rods 16 into the respective cylinders and in the retraction of the anchoring arms 4 and 5. The motion of piston 6 produces a penetration of the rod 21 into the second cylinder 20, resulting in a transfer of oil from the latter to the compartment 23a of the third cylinder 23 through line 22 and in a displacement of the free pistons 24 and 27 in their respective cylinders 23 and 26. When the arms come to their retracted position, they push the push-members 45 inside the housings 46 and trigger the switches 49 (FIG. 9). The operation of motor 9 is thus discontinued. They simultaneously actuate a reversing device (not shown) for running the motor in a reverse direction when it is actuated subsequently.

When at least one of the anchoring arms 4 and 5 is blocked by an obstacle during the retraction phase (FIG. 7), an overpressure $\Delta P$ is generated into line 18, thus requiring from motor 9 an increased mechanical power which increases its electrical consumption. Beyond a certain threshold value, the break switch disconnects its electrical supply. In any case, the security valve 32 limits the overpressure $\Delta P$ in line 18 during the retraction phase of the anchoring arms, to a threshold value $P_1$ at which it is also calibrated. In case of excessive overpressure, an oil transfer also occurs through line 25 into cylinders 23 and 26 of the means for applying the static pressure, by displacing in opposite directions the free pistons 24 and 27.

When the anchoring arms are locked in open position, as a result of a failure in the feeding circuit of the electric motor or of a locking thereof, for example, and maintain the sonde rigidly positioned in the well (FIG. 8) the latter may nonetheless be raised up to the surface by the operation of the security members 33 and of the hydraulic security system. When the sonde is pulled towards the surface, the reaction forces applied to the ends of the anchoring arms 4 and 5 by the walls of the well tend to retract the latter and since the jacks are locked, traction forces are exerted on the pivot axes 12 and 13 of the arms, thereby moving them apart from the sonde body by compression of springs 36 inside the cylindrical housings 35 and partial by disengaging the anchoring arms. The traction forces applied to the pivot axes 12 and 13 of the arms result in an increase of the hydraulic pressure inside line 19. When the overpressure $\Delta P$, with respect to the static pressure P, exceeds the threshold value $P_1$ an oil transfer occurs from bodies 15 of the jacks 14 to compartment 23a of the third cylinder 23 through the security valve 30, together with a displacement of the free pistons 24 and 27 in their respective cylinders 23 and 26. As a result, the anchoring arms are retracted.

When the sonde is lowered into the well from the surface, down to the depth at which it is used, the increase of the static pressure $\pi$ inside the body results in a displacement of the free pistons 24 and 27 and in an oil transfer from compartment 23a of cylinder 23 to lines 18 and 19 through the balancing valves 29 and 31, as soon as the pressure difference exceeds the first threshold value $P_0$.

Conversely, when the sonde is raised up to the surface, the pressure difference $\Delta P$ between the pressure prevailing inside the lines 18 and 19 and the static pressure $\pi$ must not exceed the second threshold value $P_1$ since, beyond this value, an oil transfer occurs towards cylinder 23 through the security valves 30 and 32.

It is thus apparent that in all the cases the sonde displacement, the blocking of the arms as well as eventual failures of the actuation system, cannot damage the sonde equipment.

According to an alternative embodiment of anchoring device, not shown, it is also possible to arrange the anchoring arms so that the sonde 1 is placed along the axis of the central well when it is rigidly positioned, the operation of the arms being similar as in the above described mode of operation.

What is claimed is:

1. A retractable anchoring device adapted for rigidly positioning on an intermittent basis an instrument lowered into a cavity in the earth and connected to a surface installation by means of a cable, the device comprising:
   (a) at least one pivotable anchoring arm adapted for being applied against the wall of said cavity and for being retracted therefrom;
   (b) jack means associated with said at least one pivotable anchoring arm for causing said at least one pivotable anchoring arm to be applied against the wall of said cavity, said jack means comprising movable jack rod means connected to said at least one pivotable anchoring arm for causing movement thereof;

(c) an actuation system arranged inside said instrument associated with said jack means for actuation thereof, said actuation system comprising a piston assembly displaceably arranged in a first cylinder containing a liquid therein, drive means for displacing said piston assembly to actuate said jack means, and limit means for limiting the forces applied to said at least one pivotable anchoring arm; and (d) static pressure applying means for applying to said piston assembly the static pressure prevailing in said cavity, said static pressure applying means including a chamber of variable volume for containing a liquid whose pressure is maintained substantially equal to the static pressure prevailing in said cavity, and further comprising a second cylinder in communication with said first cylinder through an opening with a rod rigidly secured to said piston assembly and being slidably mounted within said opening, and said second cylinder being further connected to and in communication with said chamber of variable volume by means of a connecting line.

2. A device according to claim 1, further comprising a third cylinder divided into two compartments by means of a free piston slidably arranged therein, the first compartment of said third cylinder defining said chamber of variable volume and the second compartment arranged in communication with means for generating a counter-pressure equal to the static pressure prevailing in said cavity.

3. A device according to claim 2, wherein said means for generating the counter-pressure comprises a line connecting said second compartment of the third cylinder to said cavity.

4. A device according to claim 2, wherein said means for generating the counter-pressure comprises a fourth cylinder divided into two parts by means of a free piston slidably arranged therein, one of said parts being in communication with said second compartment of said third cylinder, the other part being in direct communication with said cavity.

5. A device according to claim 1, wherein said piston assembly is arranged to define, with the wall of said first cylinder, two chambers respectively in communication with the opposite ends of said jack means by means of fluid lines, and wherein said limit means comprises hydraulic means for limiting the forces applied to said at least one anchoring arm during its motion aside into an anchoring position or its retraction, said hydraulic means comprising two assemblies, each made up of a one-way balancing-valve and a one-way security valve, with the valves oriented in opposite directions with respect to each other, on two parallel line sections, and respectively calibrated at two threshold values, and said two assemblies being connected respectively on one side with said two chambers of said first cylinder, and on the other side, to said static pressure applying means for applying to the piston the static pressure prevailing in the cavity.

6. A device according to claim 5, wherein said drive means comprises an electric motor fed from the surface installation through said cable, a reducing gear driving an endless screw adapted to displace said piston assembly, and said limit means for limiting the forces applied to each anchoring arm further comprising a break switch placed in the circuit feeding the electric motor for shutting off operation of said motor.

7. A device according to claim 6, wherein said limit means for limiting the forces applied to said at least one anchoring arm comprises a switch actuated by said at least one anchoring arm when, as said at least one anchoring arm is being retracted, said at least one anchoring arm reaches its retracted position.

8. A device according to claim 5, wherein said at least one anchoring arm is adapted for pivoting about an axis, and said limit means for limiting the forces applied to each anchoring arm further comprises a mechanical security member for allowing the outward displacement of said axis with respect to said instrument.

9. A device according to claim 5, further comprising lines respectively communicating with said two chambers of said first cylinder, with transducers connected to said cable for measuring the pressure prevailing in said lines.

10. A device as in claim 1, wherein said at least one retractable arm comprises two retractable arms arranged on one side of said instrument respectively proximate each end thereof.

11. A device as in claim 1, wherein said at least one retractable arm comprises two retractable arms arranged on one side of said instrument, both proximate one of the ends thereof.

12. A retractable anchoring device adapted for rigidly positioning on an intermittent basis an instrument lowered into a cavity in the earth and connected to a surface installation by means of a cable, the device comprising:

(a) at least one pivotable anchoring arm adapted for being applied against the wall of said cavity and for being retracted therefrom;

(b) jack means associated with said at least one pivotable anchoring arm for causing said at least one pivotable anchoring arm to be applied against the wall of said cavity, said jack means comprising movable jack rod means connected to said at least one pivotable anchoring arm for causing movement thereof;

(c) an actuation system arranged inside said instrument associated with said jack means for actuation thereof, said actuation system comprising a piston assembly displaceably arranged in a first cylinder containing a liquid therein, drive means for displacing said piston assembly to actuate said jack means;

(d) hydraulic limit means associated with said first cylinder for limiting the forces applied to said at least one pivotable anchoring arm during movement into an extended anchoring position, and during movement into a retracted position from the extended anchoring position; and (e) static pressure applying means for applying to said piston assembly the static pressure prevailing in said cavity, said static pressure applying means including a chamber of variable volume for containing a liquid whose pressure is maintained substantially equal to the static pressure prevailing in said cavity, and further comprising a second cylinder in communication with said first cylinder through an opening with a rod rigidly secured to said piston assembly being slidably mounted within said opening, and said second cylinder being further connected to and in communication with said chamber of variable volume by means of a connecting line.

* * * * *